Aug. 4, 1959
J. L. JENSEN
2,898,476
TRANSISTOR CONTROL APPARATUS
Filed July 5, 1955
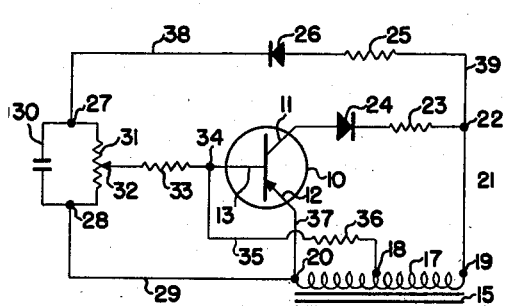
FIG. 1
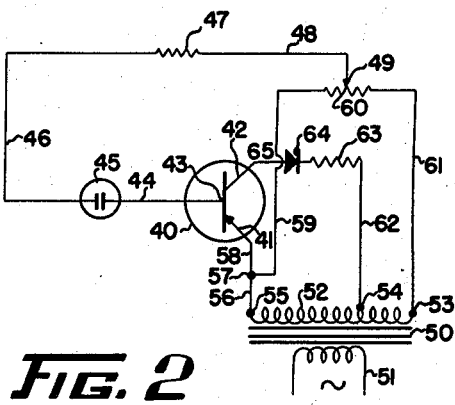
FIG. 2
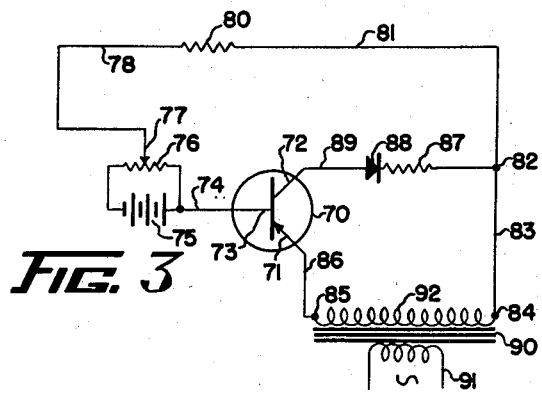
FIG. 3
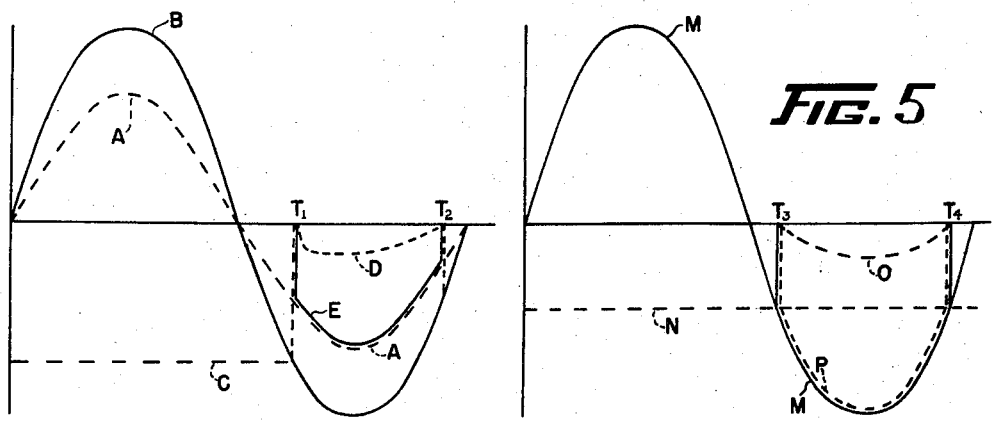
FIG. 4
FIG. 5
INVENTOR.
JAMES L. JENSEN
BY Frederick E. Lange
ATTORNEY

2,898,476
Patented Aug. 4, 1959

United States Patent Office

2,898,476
TRANSISTOR CONTROL APPARATUS

James Lee Jensen, St. Louis Park, Minn., assignor to Minneapolis-Honeywell Regulator Company, Minneapolis, Minn., a corporation of Delaware Application July 5, 1955, Serial No. 519,924

14 Claims. (Cl. 307—88.5)

This invention relates generally to transistor control circuits and is more particularly directed to control circuits wherein a switching action is utilized to modulate the output of a controlled circuit.

It is therefore an object of this invention to provide a switching apparatus wherein control of the output current is provided by controlling the initiation and cessation of conduction of a semi-conducting device during one or the other of the half cycles of an alternating current energizing voltage.

It is another object of this invention to provide a transistor control circuit wherein a large power output may be controlled from a small or low power input with an extremely low power dissipation in the controlled circuit.

Of the drawing—

Figures 1, 2, and 3 are illustrative of several embodiments of my invention.

Figure 4 shows the wave forms at various portions in the circuit shown in Figure 2.

Figure 5 illustrates the wave forms appearing at various portions of the circuits shown in Figure 3.

Referring now to Figure 1: I have shown a transistor 10 and a load resistor 23, which may be any suitable load device, energized from transformer secondary winding 17 through transistor 10. The energization of load 23 is dependent upon the conductivity of transistor 10 which in turn is controlled by the bias applied to the base.

Transistor 10 having base, emitter and collector electrodes 13, 12, and 11 is energized by secondary winding 17 of transformer 15, from terminal 20, lead 37, emitter electrode 12 of transistor 10, collector electrode 11 of transistor 10, asymmetrical current conducting device shown as a diode 24, load resistor 23, terminal 22, lead 21, to terminal 19. Primary winding 16 of transformer 15 is connected to a source of alternating potential (not shown). A bias is supplied to base 13 of transistor 10 through lead 29 connected to terminal 20, terminal 28, capacitor 30 having potentiometer 31 connected in parallel therewith, terminal 27, lead 38, an asymmetrical current conducting device shown as a diode 26, resistor 25, lead 39 and terminal 22. Wiper 32 on potentiometer 31 is connected to base electrode 13 through resistor 33. Base electrode 13 is also connected to terminal 18 on secondary winding 17 through lead 35 and resistor 36.

Operation of Figure 1

It is seen that two conditions are necessary for conduction to occur through load resistor 23. One is that the emitter to base current is flowing, which will only occur when the base electrode is negative with respect to the emitter electrode; the other is that the emitter electrode be positive with respect to the collector electrode so that the current flow through diode 24 is in the forward direction. It is therefore clear that a current flow through load 23 will occur during the negative half cycle, that is when terminal 19 is instantaneously negative with respect to terminal 20, and only when the transistor 10 is conductive which in turn is governed by the bias applied to base electrode 13 of transistor 10. It may also be seen that diode 26 in the bias supply circuit is placed so that current will flow in the bias circuit on the alternate half cycle that transistor 10 is not conductive. Assuming now that we start on a positive half cycle, that is when terminal 20 of secondary winding 17 is negative with respect to terminal 19 of secondary winding 17, current will flow from terminal 19 through lead 21, terminal 22, lead 39, resistor 25, diode 26, lead 38, terminal 27, potentiometer 31, terminal 28, and lead 29, to terminal 20. At the same time capacitor 30 will be charged and a voltage will be developed across potentiometer 31 which will be maintained during the subsequent half cycle by the discharge of capacitor 30 across potentiometer 31. Wiper 32 on potentiometer 31 may be adjusted to provide a varying bias to base 13 of transistor 10. On the next half cycle terminal 20 becomes positive with respect to terminal 19 and if transistor 10 were conductive, current would flow from terminal 20 through lead 37, emitter 12, collector 11, diode 24, load resistor 23, terminal 22 and lead 21 to terminal 19. It is apparent however that transistor 10 will not be conductive until the emitter to base current starts to flow which will be at the time the potential applied to base 13 becomes slightly negative with respect to emitter 12. This will occur when the potential at terminal 18 of secondary winding 17 exceeds the biasing potential supplied from potentiometer 31. It is seen that by adjusting potentiometer wiper 32 the period of conduction of transistor 10 may be controlled over wide limits. As transistor 10 starts to conduct, the maximum current will flow through load 23 for the remainder of the particular half cycle until the potential developed at terminal 18 on secondary winding 17 falls below the biasing potential supplied to base 13 from potentiometer 31.

Figure 2

In Figure 2 I have shown a second embodiment of my invention wherein an electrical discharge device, shown as a neon bulb 45, is used to control the conductivity of transistor 40.

Transistor 40 having emitter electrode 41, collector electrode 42, and base electrode 43 is shown with emitter electrode connected to terminal 55 of secondary winding 52 of transformer 50 through lead 58, terminal 57, and lead 56, collector electrode 42 connected to terminal 54 on secondary winding 52 through lead 65, diode 64, load resistor 63 and lead 62 and base 43 connected to a wiper 49 on potentiometer 60 through lead 44, neon tube 45, lead 46, resistor 47, and lead 48. Potentiometer 60 is connected across secondary winding 52 from terminal 55 through lead 56, terminal 57, lead 59, potentiometer 60, lead 61 and terminal 53. Transformer 50 has a primary winding 51 which may be connected to any suitable source of alternating current potential.

Operation of Figure 2

The operation of Figure 2 is similar to that of Figure 1 with the exception that the conductivity of transistor 40 is governed by the voltage applied across neon tube 45. The operation of Figure 2 is more easily explained by reference to the curves shown in Figure 4.

In Figure 4 curve A represents the voltage appearing between terminals 55 and 54 on secondary winding 52, curve B represents the voltage appearing between terminals 55 and 53 of secondary winding 52 and thereby the voltage appearing across potentiometer 60, curve C represents the point at which neon tube 45 becomes conductive, curve E represents the voltage appearing across resistor 63, curve D represents the current flow in the emitter-collector circuit of transistor 40 and T1 and T2 represent the initiation and cessation of conduction through transistor 40 respectively. It will be noted that T1 and T2 do not occur at corresponding times due to the fact that the firing voltage of a neon tube is generally higher than the extinction voltage, however, since this value may be determined, it may be compensated for. Referring again to Figures 2 and 4 it is seen that on the first half cycle the polarity of the alternating voltage is such that transistor 40 will not become conductive. During the second half cycle the voltage impressed across the emitter to base of transistor 40 and also across neon tube 45, as represented by curve B on Figure 4, is increased to a value equal to the firing voltage of neon tube 45 which is represented by curve C on Figure 4. Base current will flow in transistor 40 and as a result a current will flow in the emitter-collector circuit, as represented by curve D of Figure 4, and a voltage drop across load resistor 63 will occur as is shown by curve E of Figure 4. Conduction through transistor 40 will continue until the time indicated by T2 on Figure 4. It will be obvious to one skilled in the art that devices other than neon tube 45 may be here used. One example of a device having similar characteristics is a zener diode.

*Figure 3*

Figure 3 comprises a transistor 70 having emitter electrode 71, collector electrode 72 and base electrode 73. Transformer 90, having primary winding 91 and secondary winding 92 is connected to energize transistor 70 such that the emitter and collector electrodes are connected in parallel across secondary winding 92 and the emitter and base electrodes are connected in parallel across secondary winding 92. The circuits may be traced from terminal 85 on secondary winding 92 through lead 86, emitter electrode 71, collector electrode 72, lead 89, diode 88, load resistor 87, terminal 82, lead 83 and terminal 84 on secondary winding 92. The emitter-to-base circuit comprises terminal 85, lead 86, emitter 71, base electrode 73, lead 74, potentiometer 76 having a wiper 77, lead 78, resistor 80, lead 81, terminal 82, lead 83 and terminal 84. A battery 75 is shown connected in parallel with potentiometer 76.

Figure 5 is included to illustrate the operation of Figure 3. In Figure 5 curve M represents the voltage appearing across terminals 85 and 84 of secondary winding 92, curve N represents the point at which transistor 70 will become conductive, curve O represents the current in the emitter-collector circuit when conduction occurs and curve P represents the voltage appearing across load resistor 87.

*Operation of Figure 3*

In the operation of Figure 3 it is seen that during the first half cycle, that is when terminal 84 is positive with respect to terminal 85, transistor 70 will remain nonconductive. During the second half cycle transistor 70 will remain nonconductive until the voltage across the emitter-to-base exceeds the bias supplied by battery 75. This is represented by line N on Figure 5. When the emitter-to-base voltage exceeds this amount, as shown by points T3 and T4 on Figure 5, transistor 70 will become conductive and a current as shown by curve O will flow in the emitter-collector circuit of transistor 70. A voltage having the form shown by curve P on Figure 5 will appear across load resistor 87.

It will be understood that modifications may be made in the design and arrangement of the parts without departing from the spirit of my invention.

I claim:

1. Transistor control apparatus comprising; transformer means having a primary and a secondary winding, said secondary winding having a plurality of terminals; means connecting said primary winding to a suitable source of alternating current; transistor amplifying means having base, collector and emitter electrodes; symmetrical conducting means connecting said emitter electrode to one of said plurality of terminals; an asymmetrical current conducting device; impedance means; means connecting said asymmetrical current conducting device and said impedance means intermediate said collector electrode and another of said plurality of terminals; and potential responsive means, connecting said base electrode to one of said plurality of terminals so as to control the conduction of said amplifying means whereby said amplifying means is conductive when the magnitude of the alternating potential across said secondary winding exceeds a predetermined value.

2. Transistor control apparatus comprising; transformer means having a primary and a secondary winding, said secondary winding having a plurality of terminals; means connecting said primary winding to a suitable source of alternating current; a transistor device having base, emitter and collector electrodes; output means; an asymmetrical current conducting device; symmetrical conducting means connecting said emitter electrode to a first terminal on said secondary winding; means connecting said asymmetrical current conducting device and said output means intermediate said collector electrode and a second terminal on said secondary winding; and means connecting potential responsive switching means for controlling the conduction of said amplifying means intermediate said base electrode and one of said terminals of said secondary winding.

3. Transistor control apparatus comprising; a source of alternating current potential; transistor amplifying means having emitter, base and collector electrode; an asymmetrical current conducting device; impedance means; symmetrical conducting means connecting said emitter electrode to said source of alternating current potential; means connecting said asymmetrical current conducting device and said impedance means intermediate said collector electrode and said source of alternating potential; and means connecting said base electrode to said source of alternating current potential said connecting means including potential responsive switching means whereby said amplifying means is nonconductive whenever said source of alternating potential falls below a predetermined value.

4. Electrical switching apparatus comprising; a source of alternating current potential; a semi-conducting device having first, second, and third terminals; an asymmetrical impedance means; output means; symmetrical conducting means connecting the first of said terminals to said source of alternating current potential; means connecting said asymmetrical impedance means and said output means intermediate said second terminal and said source of alternating potential; and means including potential responsive switching means, connecting said third electrode to said source of alternating current potential so as to control the conduction of said semi-conducting device.

5. Transistor control apparatus comprising; transformer means having a primary winding and a secondary winding, said secondary winding having first, second and third terminals; transistor amplifying means having emitter, base and collector electrodes; first and second asymmetrical current conducting devices; impedance means; means connecting said emitter electrode to said first terminal of said secondary winding; means connecting said first asymmetrical current conducting device and said impedance means intermediate said collector electrode and said second terminal of said secondary winding; resistance means connecting the third terminal on said secondary winding to said base electrode; capacitor means having a potentiometer connected in parallel therewith; means connecting said capacitor means and said second asymmetrical current conducting device in series across the first and second terminals of said secondary winding; and resistance means connecting the wiper of said potentiometer to said base electrode to bias said transistor amplifying means nonconductive when the potential across said secondary winding is less than a predetermined level.

6. Switching apparatus comprising; a source of alternating current; a semi-conducting device having first, second, and third terminals; first and second asymmetrical current conducting devices; means connecting said first terminal to said source of alternating current; means connecting said first asymmetrical current conducting device and an impedance means intermediate said second terminal and said source of alternating current; capacitor means having an adjustable impedance means connected in parallel therewith; impedance means connecting said third terminal to said source of alternating current; means connecting said second asymmetrical current conducting device and said capacitor means across said source of alternating current; and impedance means connecting said adjustable impedance means to said third terminal on said semiconducting device.

7. Transistor control apparatus comprising transformer means having a primary and a secondary winding, said secondary winding having first, second and third terminals; a transistor device having emitter, base and collector electrode; impedance means; an asymmetrical current conducting device; potentiometer means; a gaseous discharge device; means connecting said potentiometer means across the first and third terminals on said secondary winding; means connecting said emitter electrode to said first terminal; means connecting said impedance means and said asymmetrical current conducting device intermediate said collector electrode and said second terminal; and means connecting said gaseous discharge device intermediate said base electrode and the wiper of said potentiometer.

8. Switching apparatus comprising; a source of alternating current; a semi-conductor device having first, second, and third terminals; an asymmetrical current conducting device; output means; a potential responsive non-linear impedance means; means connecting said first terminal to said source of alternating current; means, including said asymmetrical current conducting device and said output means, connecting said second terminal to said source of alternating current; and means connecting said non-linear impedance means intermediate said third terminal and said source of alternating current.

9. Switching apparatus for controlling the current flow in a load device comprising; a source of alternating current; a semi-conductor device having first, second and third terminals; an asymmetrical current conducting device; a load device; a gaseous discharge device; means connecting said first terminal to said source of alternating current; means, including said load device and said asymmetrical current conducting device intermediate said second terminal and said source of alternating current; and means connecting said gaseous discharge device intermediate said source of alternating current and said third terminal.

10. Switching apparatus for controlling the flow of energy through a load device comprising; a semiconductor device having input and output terminals; a load device; an asymmetrical current conducting device; adjustable potential responsive switching means for controlling the conduction of said semiconductor device; means connecting said load device, said asymmetrical current conducting device and a source of alternating current intermediate said output terminals; and means connecting said adjustable switching means for controlling the conduction of said semiconductor device and a source of alternating current intermediate said input terminals.

11. Transistor control apparatus for controlling the flow of electrical energy through a load device comprising; a semiconductor device having first, second and third terminals; a load device; an asymmetrical current conducting device; adjustable biasing means for controlling the conduction of said semiconductor device; means connecting said load device and said asymmetrical current conducting device intermediate said first terminal and a first terminal on a source of alternating current, said source of current also having further terminals; symmetrical conducting means connecting said second terminal to a further terminal on said source of alternating potential; and symmetrical conducting means connecting said adjustable biasing means intermediate said third terminal and a further terminal on said source of alternating current.

12. Electrical switching apparatus for controlling the average current flow through a load device comprising; a semiconductor device having input and output terminals; a load device; an asymmetrical current conducting device; biasing means for biasing said semiconductor device non-conductive below a predetermined input level; a first source of alternating current; a second adjustable source of alternating current; means connecting said load device, said asymmetrical current conducting device and said first source of alternating current intermediate said output terminals; and symmetrical conducting means connecting said biasing means and said second source of alternating current intermediate said input terminals.

13. Switching apparatus for controlling the conduction of a current conducting device so that initiation and cessation of conduction of said conducting device occur at substantially equal times on alternate half cycles of an alternating energization current, comprising; a semiconductor device having input and output terminals; an asymmetrical current conducting device; biasing means for establishing a datum below which said semiconductive remains nonconductive; load means; a first source of alternating current; means connecting said biasing means and said first source of alternating current intermediate said input terminals; a second source of alternating current; and means connecting said asymmetrical current conducting device, said load means and said second source of alternating potential intermediate said input terminals.

14. Switching apparatus for controlling the current flow in a load device comprising; a source of alternating current a semiconductor device having first, second and third terminals; a potential responsive switch means; means connecting said first terminal to said source of alternating current; means, including said load device and said asymmetrical current conducting device intermediate said second terminal and said source of alternating current; and means connecting said potential responsive switching means intermediate said source of alternating current and said third terminal.

References Cited in the file of this patent

UNITED STATES PATENTS

| 2,061,011 | Vingerhoets | Nov. 17, 1936 |
| 2,165,048 | Gulliksen | July 4, 1939 |
| 2,471,834 | McDowell | May 31, 1949 |
| 2,641,701 | Moore | June 9, 1953 |
| 2,666,819 | Raisbeck | Jan. 19, 1954 |
| 2,691,073 | Lowman | Oct. 5, 1954 |
| 2,722,649 | Immel et al. | Nov. 1, 1955 |

OTHER REFERENCES

Philbrook: "Obtaining Transistor Characteristic Curves," Radio and Television News, September 1953, pp. 66–67 and 130–132.

Transistors Theory and Practice by Turner, page 28 Apr. 2, 1954. Gernsback Publications, New York city.